United States Patent
Barth et al.

(10) Patent No.: US 6,196,927 B1
(45) Date of Patent: Mar. 6, 2001

(54) ARRANGEMENT FOR RELATIVE ADJUSTMENT OF ROTATION ANGLE OF A CONTROL SHAFT OF AN INTERNAL COMBUSTION ENGINE

(75) Inventors: Roland Barth, Munich; Wolfgang Kreinhoefner, Haimhausen; Klaus Mayinger, Friedberg, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 08/399,715

(22) Filed: Mar. 3, 1995

(30) Foreign Application Priority Data

Mar. 3, 1994 (DE) .................................. 44 06 983

(51) Int. Cl.⁷ .................................................. F16D 1/12
(52) U.S. Cl. ................................................ 464/160
(58) Field of Search ...................... 464/1, 160, 161, 464/162, 169, 2

(56) References Cited

U.S. PATENT DOCUMENTS

| 2,977,778 | * | 4/1961 | Backlund et al. ................ 464/1 |
| 3,149,482 | * | 9/1964 | Gitlin et al. ..................... 464/160 |
| 3,247,734 | * | 4/1966 | Africano et al. ............... 464/160 X |
| 3,675,444 | * | 7/1972 | Whipple ........................ 464/160 |
| 4,464,137 | * | 8/1984 | Jennings ...................... 464/160 X |
| 5,211,141 | * | 5/1993 | Hannibal et al. ................ 464/1 X |

FOREIGN PATENT DOCUMENTS

| 4218082 | * | 12/1993 | (DE) ............................ 464/160 |
| 42 33 250C1 | | 1/1994 | (DE) . |
| 314163 | * | 1/1934 | (IT) ............................. 464/160 |

OTHER PUBLICATIONS

Haeders HilfsBücher Für Maschinenbau, *Konstruieren Und Rechnen Für Studium and Praxis*, p. 316 (Fig. 3) 1961.
Niemann, *Maschinenelemente*, p. 192 (Fig. 12/16 (1954)).

* cited by examiner

Primary Examiner—Lynne H. Browne
Assistant Examiner—Greg Binda
(74) Attorney, Agent, or Firm—Evenson, McKeown, Edwards & Lenahan, P.L.L.C.

(57) ABSTRACT

An arrangement for the relative adjustment of the angle of rotation of a shaft with respect to a driving wheel, particularly a control shaft of an internal-combustion engine, in which a device for frictional damping equipped with a prestressed diaphragm spring is provided between the driving wheel and the shaft. For achieving a frictional damping which does not abate in the case of operationally caused component changes, the diaphragm spring is selected with a course of the characteristic curve which is relatively negative in sections. The diaphragm spring is prestressed such that a spring path is assigned to the diaphragm spring along a predetermined operating range in the relatively negative course of the characteristic curve.

24 Claims, 2 Drawing Sheets

ARRANGEMENT FOR RELATIVE ADJUSTMENT OF ROTATION ANGLE OF A CONTROL SHAFT OF AN INTERNAL COMBUSTION ENGINE

BACKGROUND AND SUMMARY OF THE INVENTION

The present invention relates to an arrangement for the relative adjustment of the rotation angle of a control shaft with respect to a driving wheel, particularly for an internal combustion engine.

DE-C 42 33 250 suggests, for prevention of noise generated in the drive of a known arrangement, that, among others, a prestressed diaphragm spring be arranged between the parts which can be angularly moved relative to one another. With the selection of an operating range for the provided spring path in a positive course of the characteristic curve, a diaphragm spring will result in considerable changes in the prestressing forces toward lower values even in the case of slight changes between the components in the spring path direction. These changes also reduces the extent of the frictional damping between the angularly movable parts.

Diaphragm springs with positive and negative courses in their characteristic curves are, of course, well known as shown in Haeders Hilfsbucher Fur Maschinenbau, Konstruieren und Rechnen Fur Studium Und Praxis, p. 316 (FIG. 3) and Niemann, Maschinenelemente, p. 192 (FIGS. 12/16) (1954). These characteristics depend on value obtainef for calculations off a spring configuration, particularly of the height of the cone of the diaphragm spring.

It is an object of the present invention to provide an improved arrangement of the above-mentioned type by way of which a reduction of the frictional damping between angularly movable parts connected with operationally caused changes of the components is securely avoided.

The foregoing object has been achieved in that the diaphragm spring is selected to have a course of a characteristic curve which is relatively negative in sections and is arranged in a prestressed manner such that, along a predetermined operating range, a spring path in the relatively negative course of the characteristic curve is assigned to the diaphragm spring.

It is an advantage of the present invention that, in an operating range of the diaphragm spring which is averaged at the reversal point of an essentially uniformly curved, relatively negative course of the characteristic curve, with axial deviations of the measurements of the components caused by the operation, the spring tension will increase and a reduction of the frictional damping will therefore not occur.

For advantageously avoiding such fluctuations of the spring prestress in dynamic systems, in a further embodiment, the diaphragm spring has in the relatively negative course of the characteristic curve, a spring force which is essentially constant along the operating range.

The present invention has a preferred application in the arrangement in DE-C 41 10 088, in which the diaphragm spring, while being supported against a shaft-side flange or against a ring non-rotatably connected with the flange, is arranged to be indirectly or directly affecting one of the faces of the driving wheel arranged to be movable with respect to the angle of rotation between the flange and the ring.

By fixing the operating range of the prestressed diaphragm spring in a relatively negative course of the char-
acteristic curves selected in the end range of the maximal spring path, a device for friction damping is achieved which has an advantageously narrow construction in the axial direction.

For avoiding wear which may be caused by movements of the driving wheel with respect to the angle of rotation, the diaphragm spring advantageously affects one of the faces of the driving wheel by way of an intermediate ring. In order to also prevent wear between the diaphragm spring and an intermediate ring, the latter are arranged in a rotationally secured manner by supporting bolts which non-rotably connect the ring with the flange. For this purpose, the diaphragm spring have recesses which are configured to be adapted to the supporting bolts; particularly recesses are provided on the outer edge of the diaphragm spring, to be used as safety devices with respect to rotation.

In a further embodiment of the recesses of the diaphragm spring as slots which are penetrated by the supporting bolts, are radially directed and are preferably open on the side of the outer edge, the diaphragm spring can be selected corresponding to the given installation space in the radial dimension in the optimum manner with respect to the dimensions for the inside and outside diameters which also determine the spring characteristic.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 2:
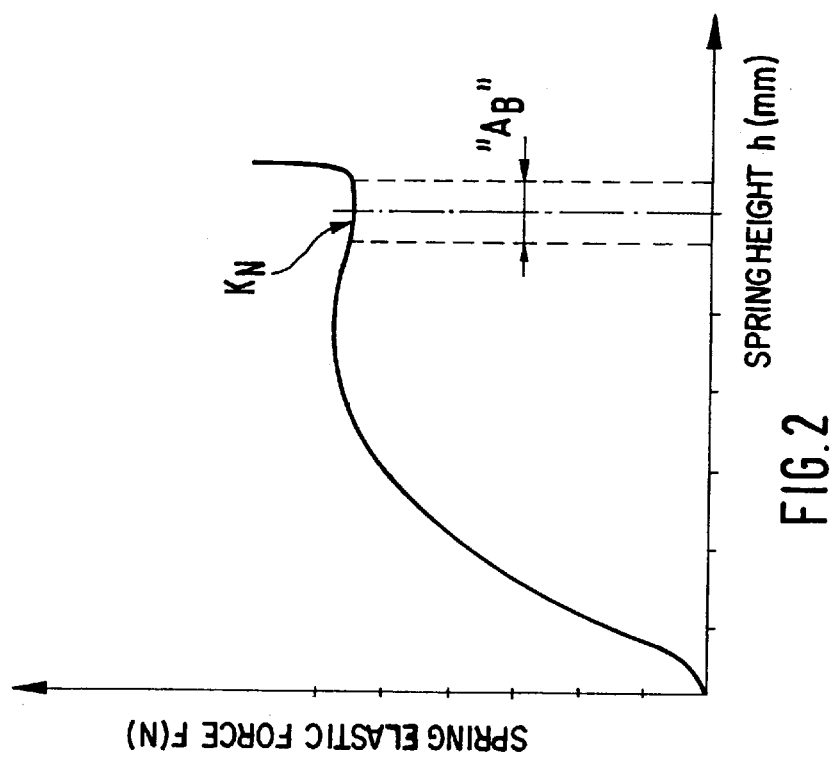
FIG. 2 is a characteristic curve of the spring force of the diaphragm spring of FIG. 1 with a depression-type section, as the relatively negative section of the curve course, between rising sections of the curve shape or course.
Figure 1:
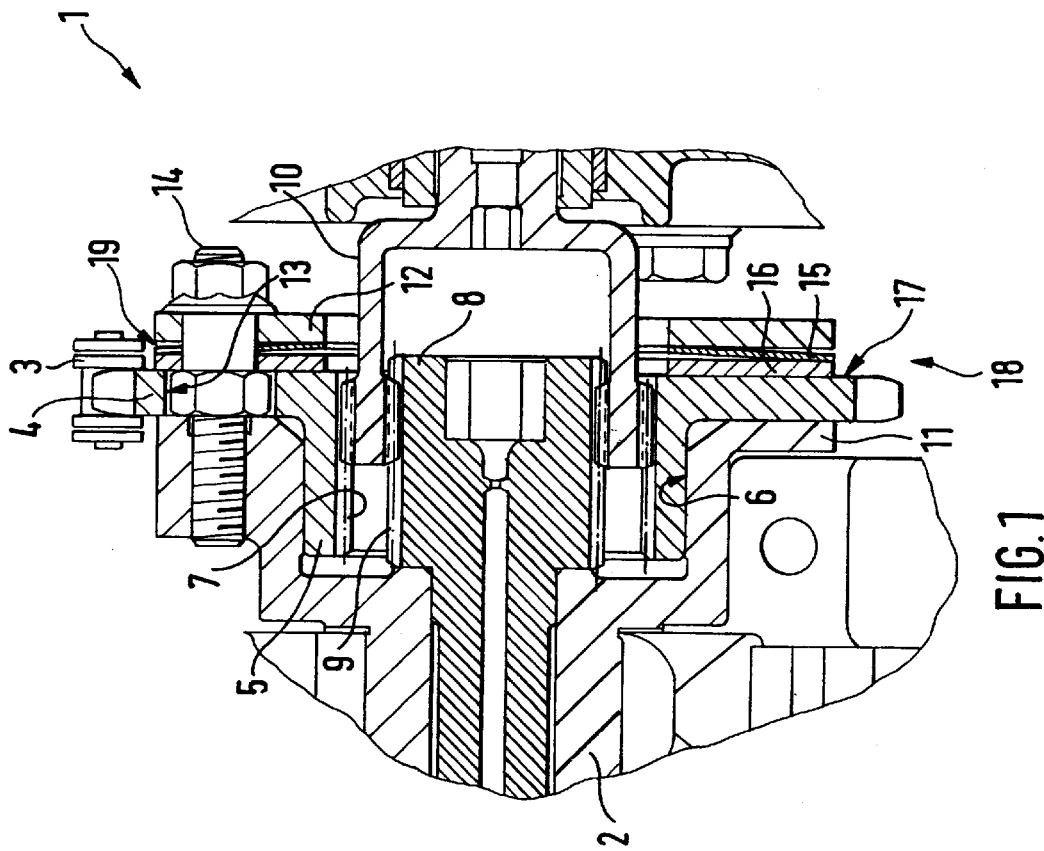
FIG. 1 is a longitudinal sectional view of an arrangement for the relative adjustment of the angle of rotation of a shaft with respect to a driving wheel with a frictional damping by way of a diaphragm spring according to the present invention.

An arrangement is designated generally by numeral 1 and is used for relative adjustment of the angle of rotation of a control shaft 2 (shown only in sections) of an internal-combustion engine (not shown) with respect to a driving wheel 4 which is in a driving connection by way of a chain 3 with a crankshaft (also not shown). An adjusting hub 5 on the driving wheel is sized to be received in a bearing bore 6 of the control shaft 2 to center the driving wheel 4 coaxially with the control shaft 2. camshaft 2. A pin 8, which is coaxially, non-rotatably connected with the control shaft 2 and has an external toothing 9, is assigned to the adjusting hub 5 which is provided with an internal toothing 7. A push element 10 which can be axially adjusted in a controlled/regulated manner engages in the toothing 7, 9 which extend in opposite directions with respect to one another. By the axial displacement of the push element 10, the control shaft 2 can be angularly adjusted relative to the driving wheel 4 via the oppositely directed toothing.

The driving wheel 4 is arranged so that it can be moved with respect to the angle of rotation between a shaft-side flange 11, as a direct axial stop, and a ring 12, as an additional indirect axial stop. In this case, the ring 12 is non-rotatably connected with the flange 11 by supporting bolts 14 penetrating openings 13 arranged in the drive wheel 4 with a floating of the angle of rotation. While being supported against the ring 12, a prestressed diaphragm spring 15 acts, by way of an intermediate ring 16 indirectly upon a face 17 of the driving wheel 4 for achieving a frictional damping. The diaphragm spring 15 is sized and configured to have characteristics through conventional calculations with additional known calculations being made for slots 19 shown in FIGS. 3 and 4 and the like provided in the spring for receiving bolt 14 and the like.

In order to securely avoid a reduction of the frictional damping between the driving wheel 4 and the control shaft 2 caused by the prestressed diaphragm spring 15 and connected with operationally caused changes, the diaphragm spring 15 is selected with a course of direction $K_N$ of the characteristic curve which is relatively negative in sections as illustrated in FIG. 2 and is arranged to be prestressed such that a spring path along a predetermined operating range $A_B$ in the relatively negative course $K_N$ of the characteristic curve is assigned to the diaphragm spring 15. Preferably, the diaphragm spring 15 has a spring force F in the relatively negative course $K_N$ of the characteristic curve which is constant essentially along the operating range $A_B$ of the diaphragm spring. This avoids fluctuations in the prestressing force of the diaphragm spring in the dynamically stressed arrangement 1.

In order to achieve a device 18 of an axially short construction for the frictional damping by the diaphragm spring 15, as illustrated in FIG. 2, the diaphragm spring 15 has a relatively negative course $K_N$ of the characteristic curve provided in the end range of the maximal spring path.

Figure 3:
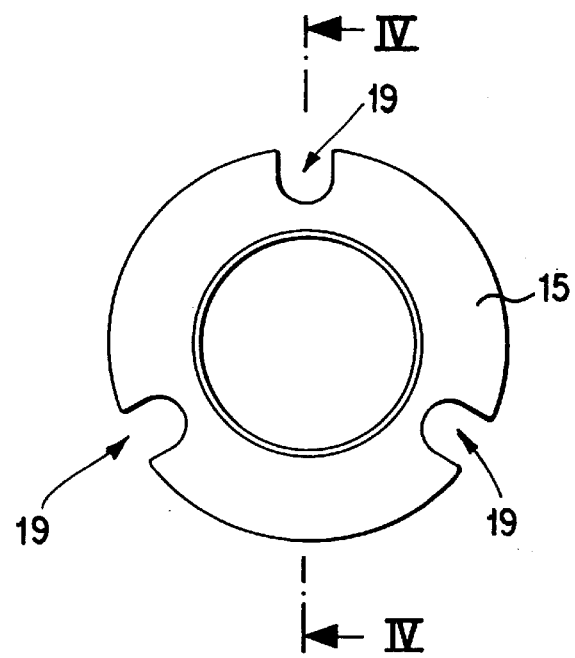
FIG. 3 is an elevational view of the diaphragm spring of FIG. 1.
Figure 4:
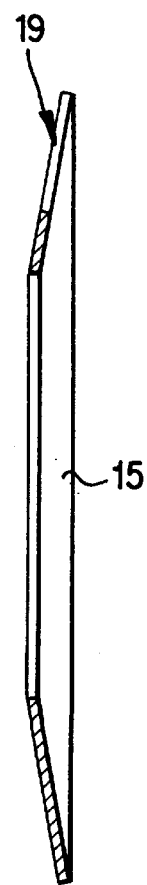
FIG. 4 is an enlarged cross-sectional view taken along line IV—IV of FIG. 3.

The intermediate ring 16 for avoiding a direct wear-affected contact of the diaphragm spring 15 on the face 17 of the driving wheel 4, is arranged, together with the diaphragm spring 15, in a rotationally secured manner by the supporting bolts 14 for preventing further wear-caused relative movements with respect to the angle of rotation. For this purpose, the diaphragm spring 15 has recesses which are shaped as slots 19, are penetrated by the supporting bolts 14 as are openings 13 in the driving wheel 14, are directed in a radial manner and are preferably open on the outer edge side as shown in FIGS. 3 and 4. With this construction, the diaphragm spring 15 can be selected in the best possible manner corresponding to the given installation space in the radial dimension with respect to the dimensions of the inside and outside diameters of the diaphragm spring 15 which also determine the spring characteristic.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for relative adjustment of a rotation angle of a shaft with respect to a driving wheel, comprising:
   an adjusting hub associated with the driving wheel to coaxially center the driving wheel which is angularly adjustable with respect to the shaft; axial stops arranged on opposed sides of the driving wheel and one of the axial stops being frictionally engageable with the driving wheel; and a prestressed diaphragm spring having a predetermined operating range of spring movement to move the driving wheel into frictional engagement with one of the axial stops; wherein the prestressed diaphragm spring is selected to have a characteristic curve whose shape is relatively negative and substantially constant along a movement path of the predetermined operating range.

2. The arrangement according to claim 1, wherein the shaft is associated with an internal combustion engine.

3. The arrangement according to claim 1, wherein, in the relative negative characteristic curve course, the diaphragm spring has a constant spring force essentially along the predetermined operating range.

4. The arrangement according to claim 1, wherein the driving wheel is arranged to be movable with respect to the rotation angle between a shaft-side flange constituting one of the axial stops, and a ring constituting another of the axial stops, the ring being non-rotatably connected with the flange by supporting bolts which penetrate openings arranged in the driving wheel with a floating of the rotation angle, and the diaphragm spring, while being supported against one of the rings and the flange, is arranged to affect a face of the driving wheel.

5. The arrangement according to claim 4, wherein, in the relative negative characteristic curve course, the diaphragm spring has a constant spring force essentially along the predetermined operating range.

6. The arrangement according to claim 1, wherein the diaphragm spring is configured and arranged to act, via an intermediate ring, upon a face of the driving wheel.

7. The arrangement according to claim 6, wherein, in the relative negative characteristic curve course, the diaphragm spring has a constant spring force essentially along the predetermined operating range.

8. The arrangement according to claim 7, wherein the driving wheel is arranged to be movable with respect to the rotation angle between a shaft-side flange constituting one of the axial stops and a ring constituting another of the axial stops, the ring being non-rotatably connected with the flange by supporting bolts which penetrate openings arranged in the driving wheel with a floating of the rotation angle, and the diaphragm spring, while being supported against one of the rings and the flange, is arranged to affect a face of the driving wheel.

9. The arrangement according to claim 6, wherein the diaphragm spring and the intermediate ring are arranged in a rotationally fixed manner by supporting bolts.

10. The arrangement according to claim 1, wherein the diaphragm spring has recesses configured to serve as securing devices with respect to rotation and adapted to receive supporting bolts.

11. The arrangement according to claim 10, wherein, in the relative negative characteristic curve course, the diaphragm spring has a constant spring force essentially along the predetermined operating range.

12. The arrangement according to claim 11, wherein the driving wheel is arranged to be movable with respect to the rotation angle between a shaft-side flange constituting one of the axial stops, and a ring constituting another of the axial stops, the ring being non-rotatably connected with the flange by supporting bolts which penetrate openings arranged in the driving wheel with a floating of the rotation angle, and the diaphragm spring, while being supported against one of the rings and the flange, is arranged to affect a face of the driving wheel.

13. The arrangement according to claim 12, wherein the diaphragm spring is configured and arranged to act, via an intermediate ring, upon a face of the driving wheel.

14. The arrangement according to claim 13, wherein the supporting bolts secure the diaphragm spring and the intermediate ring in a rotationally fixed manner.

15. The arrangement according to claim 10, wherein the recesses of the diaphragm spring are radially directed slots configured and sized to be penetrable by the supporting bolts.

16. The arrangement according to claim 1, wherein a relatively negative characteristic curve course of the diaphragm spring is in an end range of the maximal spring path.

17. The arrangement according to claim 16, wherein, in the relative negative characteristic curve course, the diaphragm spring has a constant spring force essentially along the predetermined operating range.

18. The arrangement according to claim 17, wherein the driving wheel is arranged to be movable with respect to the rotation angle between a shaft-side flange constituting one of the axial stops, and a ring constituting another of the axial stops, the ring being non-rotatably connected with the flange by supporting bolts which penetrate openings arranged in the driving wheel with a floating of the rotation angle, and the diaphragm spring, while being supported against one of the rings and the flange, is arranged to affect a face of the driving wheel.

19. The arrangement according to claim 18, wherein the diaphragm spring is configured and arranged to act, via an intermediate ring, upon a face of the driving wheel.

20. The arrangement according to claim 19, wherein the diaphragm spring and the intermediate ring are arranged in a rotationally fixed manner by supporting bolts.

21. Apparatus for relative adjustment of an internal combustion engine shaft relative to a driving wheel which is coaxially centered with the shaft, comprising:

a flange fixed at an end of the shaft, a ring operatively associated with the flange via bolts, the driving wheel being disposed between the flange and the ring, and having openings for the bolts to pass therethrough for a floating rotation angle, a prestressed cup spring being operatively arranged between the driving wheel and the ring in which the flange acts as a direct axial stop and the ring acts as an indirect axial stop, wherein the prestressed cup spring is supported against one of the axial stops to act upon a face of the driving wheel and has recesses through which the bolts pass and which provide a characteristic curve whose shape is relative negative and essentially constant along a spring movement path of the predetermined operating range.

22. Apparatus according to claim 21, wherein the recesses are radial slots.

23. Apparatus according to claim 21, wherein the prestressed cup spring has a relatively negative characteristic curve course in an end range of spring movement path.

24. Apparatus according to claim 21, wherein an intermediate ring is disposed between the prestressed cup spring and a face of the driving wheel and is non-rotatably connected with the ring by the bolts.

* * * * *